A. L. BOWER.
AUTOMATIC TRAIN CONTROLLING DEVICE.
APPLICATION FILED MAR. 17, 1914.
1,261,901.
Patented Apr. 9, 1918.
2 SHEETS—SHEET 2.
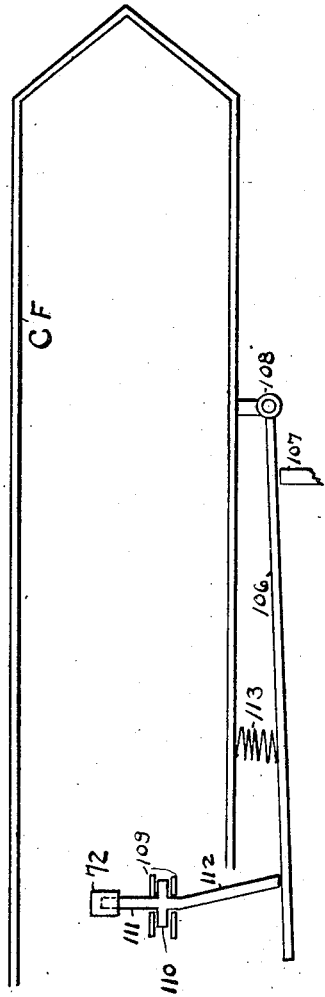
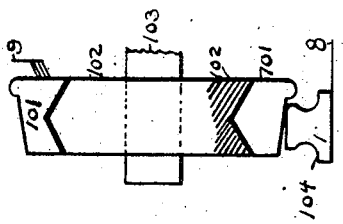
Witnesses
Inventor
A. L. Bower.

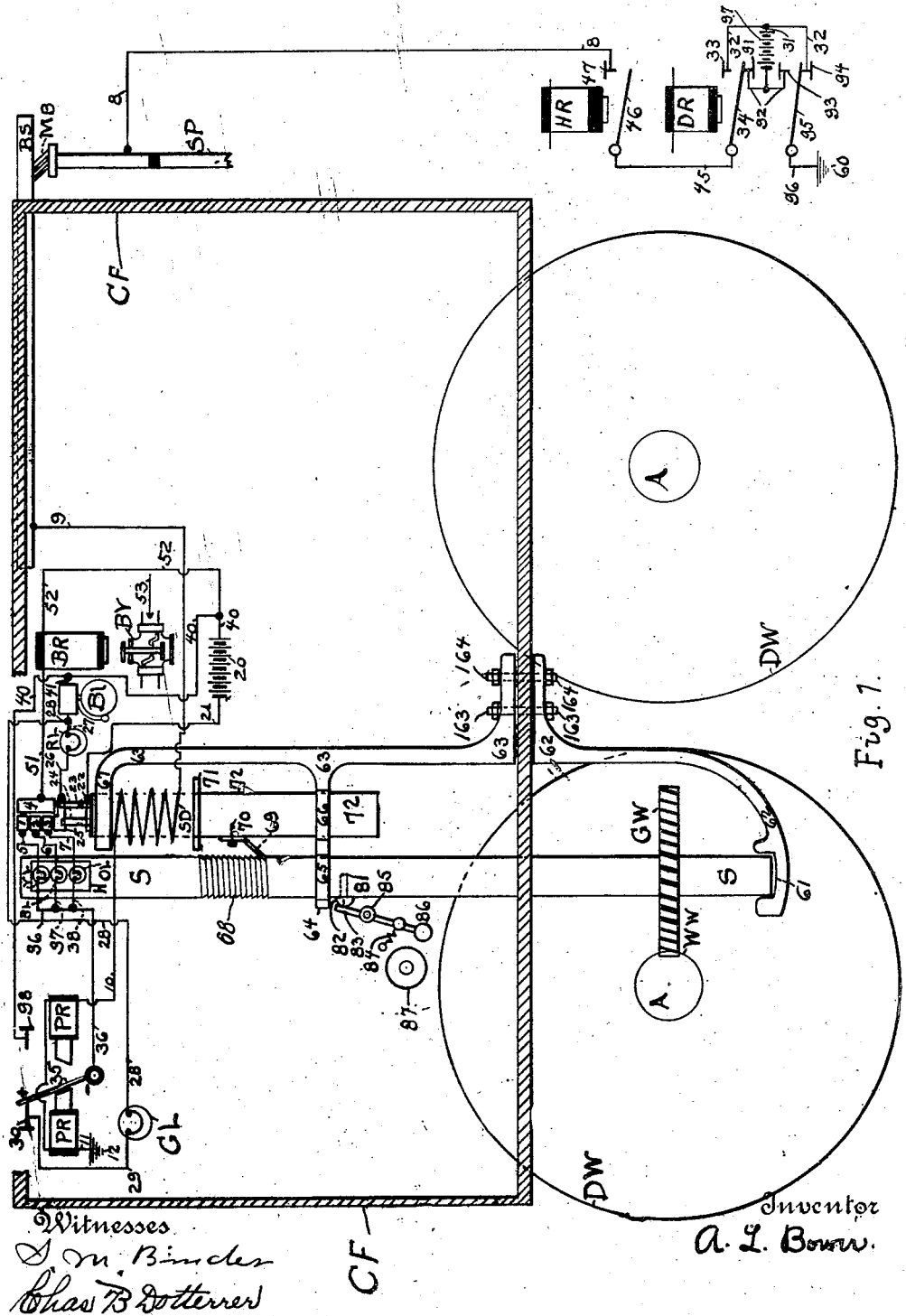

UNITED STATES PATENT OFFICE.

ABRAM L. BOWER, OF BOYERTOWN, PENNSYLVANIA.

AUTOMATIC TRAIN-CONTROLLING DEVICE.

1,261,901. Specification of Letters Patent. Patented Apr. 9, 1918.

Application filed March 17, 1914. Serial No. 825,385.

*To all whom it may concern:*

Be it known that I, ABRAM L. BOWER, a citizen of the United States, and a resident of Boyertown, in the county of Berks and State of Pennsylvania, have invented a new and useful Improvement in Automatic Train-Controlling Devices, of which the following is a specification.

This invention has for its object a system of train control utilizing a valve for operating the brakes, in combination with means on the vehicle driven in accordance with its movement along the trackway and capable of an operative condition toward which it is constantly driven, with devices on the trackway which reset those means away from operative condition.

In its simplest form, the invention comprises a brake valve controlled by an electric circuit, a screw carried by a vertical shaft operated by a worm gear on a driving-wheel axle of the vehicle, a rod supported vertically on the screw and adapted to be carried downward by gravity and the movement of the screw, the rod operating the brake valve and applying the brakes, either directly or by means of an electric circuit when the vehicle has traveled a limited distance. Electrical means are used to restore the rod to its upper position and prevent the brake application or permit the release of the brakes at certain positions on the trackway governed by clear traffic conditions ahead of the vehicle.

The invention has also for its object a system of signals operated by the devices used which inform the engine driver at all times as to the operation of the devices and also the condition of the track ahead of the vehicle.

This invention is an improvement on the devices shown in patents numbered 788513 and 832652, respectively granted to me on May 2, 1905 and Oct. 9, 1906, and in my serial applications numbered and dated as follows:—

Application Number 511818, filed Aug. 7, 1909.

Application Number 750275, filed Feb. 24, 1913.

Application Number 795301, filed Oct. 15, 1913.

Figure 1 of the drawings accompanying this specification shows a plan for carrying out the objects stated.

Fig. 2 shows a track plan with overlaps, insulated rail sections and an insulated contact device on the vehicle.

Fig. 3 shows a mechanical device for raising rod 72 to be described.

Fig. 4 shows a wheel contact with an insulated tire.

An axle A of the driving wheels DW has a worm gear WW cut therein. This gear engages a gear wheel GW carried by a vertical shaft S provided with a screw cut about twelve threads to the inch and with the top of the threads practically horizontal and the bottom very much slanted to permit a spring support 69 carried by a square rod 72 to travel upward over the threads easily and to support the spring support and with it the square rod on the top of any one of the threads.

The square rod is loosely supported in a vertical position in square holes 66, 67 in a support 63 bolted to the cab frame or floor CF. The shaft S is supported in a bearing 61 at the lower end of a support 62 also bolted to the cab frame or floor.

Shaft S has a hole H cut through it near its upper end and three electric lamps VL, BL, and OL, colored respectively violet, blue and orange are hidden back of this hole. A complete rotation of the shaft permits these lights to be seen twice. These lamps are clear signals permitting full speed of the vehicle whenever they burn brightly.

Forward movement of the train operates the gears and shaft in such direction as is necessary to carry the spring support 69 downward on the screw 68.

For the purpose of giving an audible indication once during each rotation of shaft S, a screw 82 is inserted in its side in the path of a free arm 83 of the clapper 86 of a gong 87. The drawing shows the arm operating in the same plane as shaft S. It is also possible to have the arm and clapper operate in a plane at right angles to the shaft.

A solenoid SD incloses the upper end of rod 72 and is adapted to raise the rod whenever the solenoid is energized. A collar 71 on the rod limits its upward movement.

Two insulated spring contacts 24, 23 are attached to an insulated metallic plate 22 carried on top of the rod. Contact 24 is adapted to slide up successively over four insulated contacts 25, 3, 2 and 1 whenever the rod is drawn up. Contact 23 is adapted to slide up over two insulated contacts 25 and 4 also whenever the rod is drawn up. At such times, contact 23 strikes contact 4 sometime before contact 24 strikes contact 3. When the rod descends, the contact 23 passes from contact 4 to contact 25 sometime after contact 24 has passed from contact 3 to contact 25.

A red electric lamp RL and an electric bell Bl are the danger or stop signals and a green lamp GL and the bell Bl are the cautionary signals. A magnet BR operates a brake valve BY when deënergized and prevents the operation of the valve when energized. A battery or generator 20 energizes the lamp bell and magnet.

An electric current impulse is picked up by an insulated brass strip or rod BS attached to the edge of the cab roof or side of the cab in a horizontal position parallel with the trackway.

The insulated strip or rod engages a metallic brush or contact MB mounted on an insulated signal post SP. As the only requirement is the transmission of an electric current from an outside source to solenoid SD, any train-carried contact which properly engages a suitable stationary contact will serve the purpose.

HR is a home relay and DR is a distant relay. The home relay operates an arm 46 having a front contact 47 connected by a wire 8 to a brush MB. The distant relay operates two arms 34 and 95 which serve as a pole changer for a battery 97. One direction of current transmits clear signal conditions and the other direction of current transmits cautionary signal conditions to the vehicle. Arm 34 is connected to arm 46 by a wire 45. Arm 95 is connected by wire 96 to the ground or track rail 60. The brass strip BS is connected by wire 9 to the solenoid. Wire 10 connects the solenoid with a polarized relay PR which is connected by wire 11 to a ground 12 or the engine frame.

The circuit is as follows:—from battery 97, to wire 31, wire 32, contact 33, arm 34, wire 45, arm 46, contact 47, wire 8, brush MB, brass strip BS, wire 9, solenoid SD, wire 10, relay PR, wire 11, ground 12, ground 60, wire 96, arm 95, contact 93 and wire 92 to the battery.

This direction of current transmits a clear signal. The opposite direction of current transmits a cautionary signal.

Battery 20 is connected by wire 21 to contact plate 22, also by wire 40 to bell Bl and to a front contact 98 of the polarized relay, also by wires 40 and 52 to magnet BR. Magnet BR is also connected to contact 4 by wire 51. Wire 28 connects the bell to a green lamp GL. Wires 28 and 27 connect the red lamp and the bell together.

Wire 26 connects the red lamp to contact 25. Wire 29 connects the green lamp to back contact post 30 of relay PR.

Arm 35 of relay PR is connected by wire 36 to the violet colored lamp VL and by wires 36 and 37 to the blue lamp BL and by wires 36 and 38 to the orange colored lamp OL.

Wire 5 connects lamp VL to contact 1. Wire 6 connects lamp BL to contact 2. Wire 7 connects lamp OL to contact 3. The arrangement of the connections to the lamps, bell, battery, etc., may be varied as either multiple or series connections are permissible. Some of this apparatus may be omitted if the signals are not desired. The signals are intended to give the engine-driver advance notice of brake operation to permit him to control his train himself.

Fig. 1 shows conditions as found when the train has come to a standstill automatically except that brush MB will have been passed and left about one fourth block length in the rear. An overlap of one-fourth block length is desirable and in this overlap the danger signals are displayed and the train stops automatically.

Half-block overlaps are shown in Fig. 2. This figure represents a single track and shows part of the rails in four blocks.

At 104 is shown an insulated rail section measuring from six to thirty feet in length. The wires 96 and 8 shown in Fig. 1 are shown connected here respectively to rails 105 and 104. Wires 11 and 9 are connected respectively to a wheel or ground connection 140 touching rail 105 and to an insulated wheel tire, truck or brush 141, touching the rail section 104.

On a double track, the insulations 121 129, 124 and 132 could be omitted. The home and distant relays are shown in Fig. 1. Their connection to Fig. 2 need not be shown as it is obvious.

The wheel shown in Fig. 4 has its tire 101 and hub 102 threaded to fit approximately and the space between the tire and hub is filled with fiber, rubber or other insulation. If rubber be used, it is inserted in a soft condition and then vulcanized.

The operation of the device is as follows: Normally the line is clear and rod 72 never drops low enough to cause contact 23 to leave contact 4 and as a result the brake magnet BR is constantly energized. The complete movement of rod 72 down to the position shown requires travel of the vehicle through about one and one-eighth blocks.

Starting at a signal post SP with a clear track ahead, the current of battery 97 raises rod 72 until collar 71 strikes the lower edge of the solenoid. At the same time spring support 69 slides up and is supported on a thread about ten threads higher up. The gears are designed to produce about ten revolutions of shaft S in one block. Contact 24 touches contact 1 and contact 23 touches contact 4. The violet lamp VL is lighted and shines through hole H whenever the shaft S is in the position shown. Magnet BR is energized. The circuit is as follows: from battery 20 to wire 40, wire 52, magnet BR, wire 51, contact 4, contact 23, plate 22 and wire 21 to the battery. From the battery, to wire 40, contact 98, arm 35, wire 36, lamp VL, wire 5, contact 1, contact 24, plate 22 and wire 21 to the battery.

The vehicle now travels about one-third block. Solenoid SD is not connected to battery 97 now. Shaft S has made about three revolutions, exposing the rays of lamp VL six times and striking gong 87 three times at intervals of six seconds, the train having a speed of sixty miles per hour.

Spring support 69 has descended three threads and contact 24 is just sliding from contact 1 onto contact 2. While passing through the next one-third block length, the blue light will flash six times and gong 87 will sound three times. Then contact 24 will touch contact 3 and the same conditions will be repeated with the orange-colored lamp flashing. The circuit to this lamp is as follows:—from battery 20, to wire 40, contact 98, arm 35, wire 36, wire 38, lamp OL, wire 7, contact 3, contact 24, plate 22, and wire 21 to the battery.

The train is now approaching the signal post SP and just after the signal post is passed without a signal impulse being received from battery 97, contact 24 will slide from contact 3 to contact 25 and red lamp RL will flash up and bell Bl will ring. This informs the driver that the brakes will operate shortly afterward. The circuit is as follows:—from battery 20 to wire 40, bell Bl, wires 28 and 27, lamp RL, wire 26, contact 25, contact 24, plate 22 and wire 21 to the battery.

However, we do not expect the impulse to fail yet. We expect a cautionary signal before a danger signal. Relay DR is deënergized but relay HR is energized and, the electric impulse is reversed and throws arm 35 of the polarized relay over to the position shown.

The green lamp lights up now and since its resistance and candle power is higher than that of the other lamps VL, BL and OL, the latter burn dimly in their proper turn but the green lamp burns brightly and bell Bl rings.

The circuit is as follows:—from battery 20 to wire 40, bell Bl, wire 28, green lamp GL, wire 29, contact 30, arm 35, wire 36, lamp VL, wire 5, contact 1, contact 24, plate 22 and wire 21 to the battery.

Finally the signal post SP is reached and the electric impulse is lacking. The red lamp soon lights up, and the green lamp goes out but the bell continues to ring and a little later contact 23 slides from contact 4 onto contact 25. The brake magnet is deënergized and the valve operates and brings the train automatically to a standstill.

The rod 72 and connections are inclosed in a cabinet carrying the inspector's seal. The seal must now be broken and rod 72 must be pushed up as far as it will go. Then the brakes may be released and the train may proceed. Another inspector will examine the seal of the cabinet and finding it broken, will require a report from the driver.

To be entirely safe, the driver should heed the danger signal and back to signal post SP and remain there until the solenoid is energized by battery 97, which will occur as soon as the block ahead is unoccupied. This device is self checking of its own errors or of any cross or break in the electrical circuits used. A failure of the current of battery 97 to reach the solenoid will stop the train, a breakage of supports 62, 63 or 6' will permit rod 72 to drop and stop the train.

A failure of battery 20 or its connections will stop the train. A breakdown of the insulation between 1, 2, 3, 4 and 25 will be detected immediately by its effect on the lamps. The power operating the shaft is enormous as it multiplies the power of axle A by the number of cogs on the gear wheel GW.

My invention does not confine the means of raising rod 72 to electrical means. It is possible to have a stationary member moved into engaging position to raise the rod when the road is clear, and withdrawn by influence of gravity when danger exists.

Such a device is shown in Fig. 3.

It consists of a bar 107 extending into the path of a long pivoted arm 106 attached to the side of the locomotive in a horizontal position. A spring 113 presses the arm outward a certain distance at its back end. A bent arm 112 pivoted at 110 and having a free end 111 resting against the lower end of the square rod 72 engages the free end of arm 106. Bar 107 is shown in the clear position and it engages the side of arm 106, gradually pressing it inward which in turn presses in arm 112 and raises the end 111 and the square rod 72 sufficiently to clear the signals and energize the brake magnet.

Various modifications may be made without departing from the spirit and scope of the invention.

I claim:—

1. In a vehicle, a worm gear on a car axle, a gear wheel engaging the worm gear, an upright shaft carrying the gear wheel, a screw on the upright shaft, said screw rotating with the shaft, an upright rod constantly riding downward on the screw threads, a contact device controlled by the rod, a circuit including the contact device, a magnet normally energized by the circuit, a train controlling device operated by the magnet together with a block controlled device for the purpose of raising said upright rod to reset said contact and train controlling devices.

2. In a vehicle, an upright shaft carrying a screw mounted concentrically on said shaft and rotating therewith, an upright rod supported on the screw threads, a train controlling device adapted to be operated by a sufficient downward movement of the upright rod, together with a resetting device for the purpose of raising the rod, said rod automatically resuming downward movement after being raised by said resetting device.

3. In a vehicle, an upright shaft carrying a screw mounted concentrically on said shaft and rotating therewith, a device moving in a vertical plane and supported on the screw threads, a train controlling device adapted to be operated by a sufficient downward movement of the afore mentioned device, with a resetting device for the purpose of resetting the first mentioned device, said first mentioned device automatically resuming downward movement after being reset.

4. A constantly rotating screw, a device moving in a vertical plane and supported on the threads of the screw, a train controlling device adapted to be operated by a sufficient movement of the afore mentioned device, together with a resetting device, said device being adapted to be operated at regular intervals under clear traffic conditions to prevent said operation of the train controlling device.

5. An automatic train stop comprising a shaft arranged to be constantly rotated by an axle on the train, a worm gear on said shaft, a rider operating in a vertical plane between an upper limit and a lower limit and riding on the threads of the worm gear, a valve controlling the air brake system, means for causing said rider to open said valve when near its lower limit, together with automatic block controlled restoring means tending to cause said rider to approach its upper limit under clear traffic conditions.

In witness whereof I have signed this specification in the presence of two subscribing witnesses this 16th day of March, 1914.

ABRAM L. BOWER.

Witnesses:
 MARY B. FREED,
 GEO. P. RAHN.